United States Patent [19]

Harris et al.

[11] Patent Number: 5,577,759
[45] Date of Patent: Nov. 26, 1996

[54] HIGH-CLEARANCE TRAILERS FOR USE IN AGRICULTURAL HARVESTING OF MULTI-HARVEST CROPS

[75] Inventors: Martin W. Harris; William R. Harris, both of Manteca, Calif.

[73] Assignee: Tuff Boy, Inc., Manteca, Calif.

[21] Appl. No.: 396,469

[22] Filed: Mar. 2, 1995

[51] Int. Cl.⁶ ........................................ B60G 1/00
[52] U.S. Cl. .......................... 280/688; 180/900; 280/789
[58] Field of Search ........................ 180/900; 280/688, 280/690, 698, 789, 93

[56] References Cited

U.S. PATENT DOCUMENTS

| | | | |
|---|---|---|---|
| 2,184,198 | 12/1939 | Seeber | 180/900 |
| 2,628,128 | 2/1953 | Rhodeen | 180/900 |
| 3,154,164 | 10/1964 | Shaw et al. | 180/900 |
| 3,179,194 | 4/1965 | Hunt | 180/900 |
| 4,159,749 | 7/1979 | Boushek, Jr. | 180/900 |
| 4,566,553 | 1/1986 | McCutcheon | 180/900 |
| 5,039,129 | 8/1991 | Balmer | 180/900 |
| 5,335,739 | 8/1994 | Pietese et al. | 180/900 |

OTHER PUBLICATIONS

Two photographs showing a trailer manufactured by Custom Equipment.
Two photographs showing a trailer manufactured by Denair.
Two photographs showing a trailer manufactured by Valley Fab.

*Primary Examiner*—Kenneth R. Rice
*Attorney, Agent, or Firm*—Bernhard Kreten, Esq.

[57] ABSTRACT

A field trailer including a chassis (20) supported by a plurality of wheels (120) having an underlying framework that communicates with the wheels (120) via a swing arm assembly (40) and a vertically disposed wheel plate (80). One wheel plate supports one wheel. Interposed between the swing arm and the wheel plate is a damper (60) that controls the movement of the swing arm (40) about a pivot (28). The structure associated with this support mechanism provides a box-shaped void between the wheels and under the suspension and provides a high clearance free from suspension projections so that produce can run under the trailer when the trailer is used for agricultural transportation from a field to a subsequent area via public roads.

48 Claims, 4 Drawing Sheets

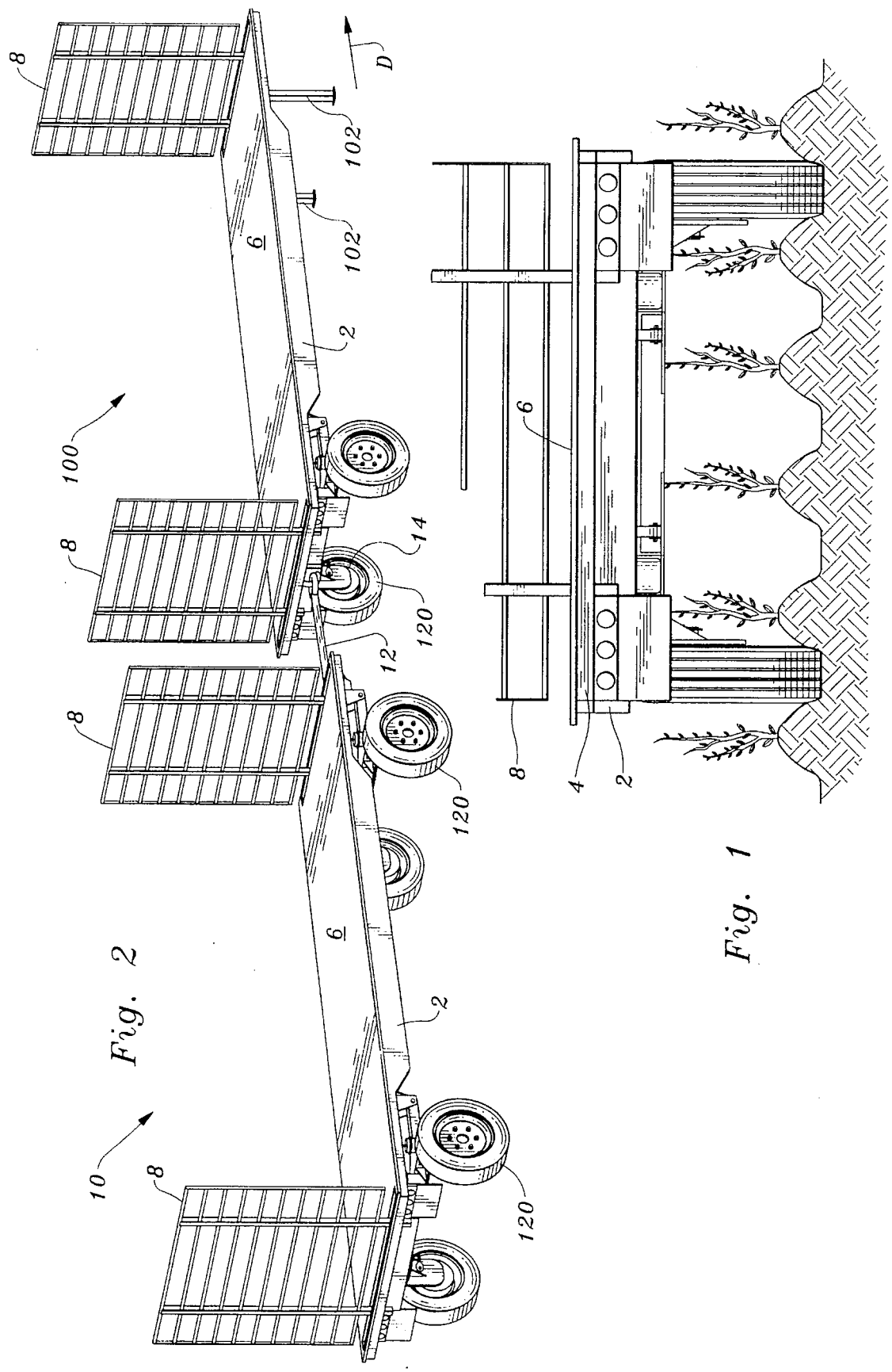

HIGH-CLEARANCE TRAILERS FOR USE IN AGRICULTURAL HARVESTING OF MULTI-HARVEST CROPS

FIELD OF THE INVENTION

This invention relates generally to trailers having a high profile for its wheel support assembly so that clearance is provided when the trailer is deployed in the harvesting of row crops. More particularly, the high-draft trailer passes over the row crops without knocking the crops down thereby allowing the field to be harvested a multiplicity of times because the crops will not have been damaged by the trailer on an earlier harvesting operation.

BACKGROUND OF THE INVENTION

For many crops, modern agricultural practice embraces growing row crops in a furrowed field with the row crop being planted on the top of ridges in rows where each row is separated from an adjacent row by a furrow. In many cases, the depth between the trough of the furrow and the apex of the ridge can be six to eight inches high. In this way, agricultural implements can travel in the furrows without compacting the soil adjacent the root structure of the plants growing on the ridges. In addition, for purposes of irrigation, plants which prefer an environment where their root structure does not have to stand in water mandate the use of the furrow and ridge arrangement. Water standing in the furrows does not adversely effect the fibrous root structure.

Vehicle widths, measured as the space between facing tires on opposite sides of the trailer, is about eighty inches. The agricultural equipment's tires ride within the furrows. When broccoli is being planted, up to four rows of plants can be deployed between the tires of agricultural implements so long as there is adequate clearance under the vehicle, such as a trailer. Each broccoli plant can extend typically eighteen to twenty-two inches above the top of the ridge. The ridge adds six inches to eight inches above the base of the furrow. Thus, a clearance of perhaps thirty inches is required to allow a trailer to pass through the field without damaging the broccoli. It should be emphasized that vast areas of certain Western States are devoted substantially to mono-culture of specialized products such as broccoli and therefore can benefit from specialized equipment. It should also be noted that broccoli is one crop for which multiple harvests can be possible from a single planting provided that the broccoli is not damaged during earlier harvesting processes.

One form of damage that is extremely common occurs when the wheel support structure on trailers which transport the broccoli from the field contacts the outer two rows of a four row set that passes under the vehicle. The maximum dimension of most trailers is dictated primarily by the maximum width and height permitted on public roads. As a result, the most common tire diameter for a trailer in this environment is approximately forty inches. Because the broccoli plant can extend twenty-eight to thirty-two inches from the bottom of the furrow, the two outboard rows of broccoli in the four row set which passes under the trailer are most susceptible to damage by the trailer's undercarriage, hanger bolts, wheel supports, suspension members, etc. during the first harvests. The most common damage resulting from structure contacting the broccoli is to knock it down thereby diminishing subsequent yield appreciably.

Thus, a tension exists between providing a vehicle trailer which is stable on public highways and is dimensioned to operate safely and reliable at highway speeds, while at the same time provides clearance when used in its intended loading environment.

The following prior art reflects the state of the art of which applicant is aware in so far as these prior art teachings appear germane to the process at hand. It is stipulated, however, that none of the structure associated with the known prior art teach singly nor render obvious the instant invention as set forth herein and as particularly claimed.

PRIOR ART

Two photographs of trailers manufactured by Custom Equipment

Two photographs of trailers manufactured by Denair

Two photographs of trailers manufactured by Valley Fab

SUMMARY OF THE INVENTION

The instant invention is distinguished over the known prior art in a multiplicity of ways. For example, one attribute of the instant invention is that it has a minimal amount of structure which projects over the rows at a height less than thirty-two inches. Instead, a box-like void exists in the four row area where the agricultural product is growing. In order to support the wheels without structure projecting into the box-like void, each wheel is supported from a substantially flat wheel plate that depends from super structure defining the major portion of the trailer. The flat wheel plate is oriented in a vertical plane, substantially perpendicular to the axis of rotation of the wheel that it supports. It is closely spaced to the wheel and provides an area of support for a wheel bearing and a brake actuator for a brake located in operative engagement with the wheel on a side of the wheel plate remote from the crops. Thus, the crops in the box-like void primarily see only one side of the vertically oriented plate and the brake actuator. As a result, the trailer can pass through the field without having portions of the undercarriage of the trailer entraining the plants residing thereunder.

The instant invention is further distinguished over the known prior art by providing extremely reliable suspension geometry while simultaneously accommodating the effective beneficial clearance. As mentioned, because the vehicle travels at highway speeds, it is still mandatory that the vehicle be stable on paved roads and maintain the ability to negotiate conditions commonly found on paved roadways, such as irregularities and bumps and especially remain stable at highway speeds whether loaded or unloaded.

Accordingly, suspension structure is supplied which supports the wheels that allows the wheels to move in response to irregularities transmitted through the supporting surface upon which the wheels reside and absorb the effect of those irregularities and prevent transmission of a substantial part of shocks associated with the road irregularities to the cargo bed. The suspension structure includes a swing arm operatively coupled to the wheels via the vertical wheel plates and a first shelf which supports a damper. One end of the swing arm is connected to a bottom side of the trailer bed. The second end of the swing arm is connected to the shelf. The damper has a lower portion located on the shelf and has a top portion connected to the bottom surface of the trailer bed. The degree to which the shelf can move about an arc (as dictated by the swing arm) is controlled by the damper and a means for limiting damper motion. Each vertical wheel plate depends from a bottom outside surface of the shelf.

OBJECTS OF THE INVENTION

Accordingly, it is a primary object of the present invention to provide a new, novel and useful high-draft trailer for use in agriculture.

It is a further object of the present invention to provide a device as characterized above which has sufficient clearance to pass through an agricultural field without damaging the crops thereby allowing the crops to realize maximum productivity.

It is a further object of the present invention to provide a device as characterized above which is safe to use on public roads at posted speed limits with predictable handling and the ability to negotiate common road conditions, such as bumps, safely.

It is a further object of the present invention to provide a device as characterized above which is extremely durable in construction, safe to use and lends itself to mass production techniques.

It is a further object of the present invention to provide a device as characterized above with an improved suspension system that accommodates the improved clearance associated with the trailer for the associated benefits.

Viewed from a first vantage point, it is an object of the present invention to provide a high-draft land vehicle for use in agricultural environments requiring enhanced clearance between a wheel support of the vehicle and plants upwardly projecting from the earth, comprising in combination: a pair of wheels oriented to have a substantially common axis of rotation, a support bed having a portion which overlies the pair of wheels, a pair of wheel supports depending downwardly from the bed, each support configured as a flat plate and each oriented in a vertical plane transverse to the axis of rotation and the plates having bearing means coupled to the wheels.

Viewed from a second vantage point, it is an object of the present invention to provide a vehicle running gear for a land vehicle for use both on and off road, comprising in combination: a chassis, a suspension swing arm having a first end connected to the chassis and a second end, a shelf connected to the second end, a damper disposed between the shelf and the chassis, vertically oriented plates depending from the shelf at lateral extremities of the chassis, and wheels attached to the plates.

Viewed from a third vantage point, it is an object of the present invention to provide a combined agricultural and road vehicle for transporting harvested produce from a field, comprising, in combination: a cargo bed to receive the produce thereon, wheels extending from a lower surface of the bed via vertically depending plates located on opposite sides of the bed, the wheels spaced on opposite bed sides a distance sufficient to straddle plants bearing the produce which underlie the bed, the plates connected to the bed via suspension means.

BRIEF DESCRIPTION OF THE DRAWINGS

FIG. 1 is an end view of the trailer according to one form of the invention showing the clearance that the trailer enjoys in an agricultural environment.

FIG. 2 is a perspective view of two trailers joined in tandem.

DESCRIPTION OF PREFERRED EMBODIMENTS

Figure 3:
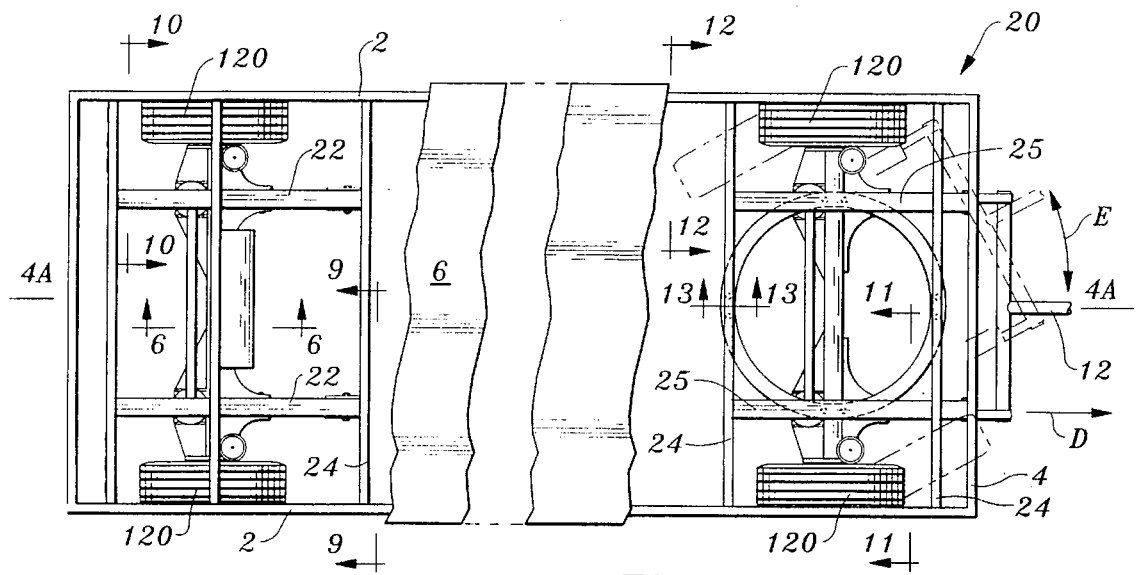
FIG. 3 is a top plan view of one trailer with portions removed, exposing underlying details.

Referring to the drawings, wherein like numerals denote like parts throughout the various figures, reference numeral 10 is directed to the field trailer according to the present invention.

In its essence, the field trailer includes a chassis 20 (FIG. 3) supported by a plurality of wheels 120 on a bottom surface thereof. The chassis 20 includes an underlying framework that communicates to the wheels via a swing arm assembly 40 (FIGS. 4 and 5) and on to the wheels 120 via a vertical wheel plate 80. One wheel plate supports one wheel. Interposed between the swing arm and the vertical wheel plate 80 is a damper 60 supported on a shelf 90. The shelf moves with the swing arm 40 about pivot 28 along arrow "A", but is controlled by damper 60.

Figure 4:
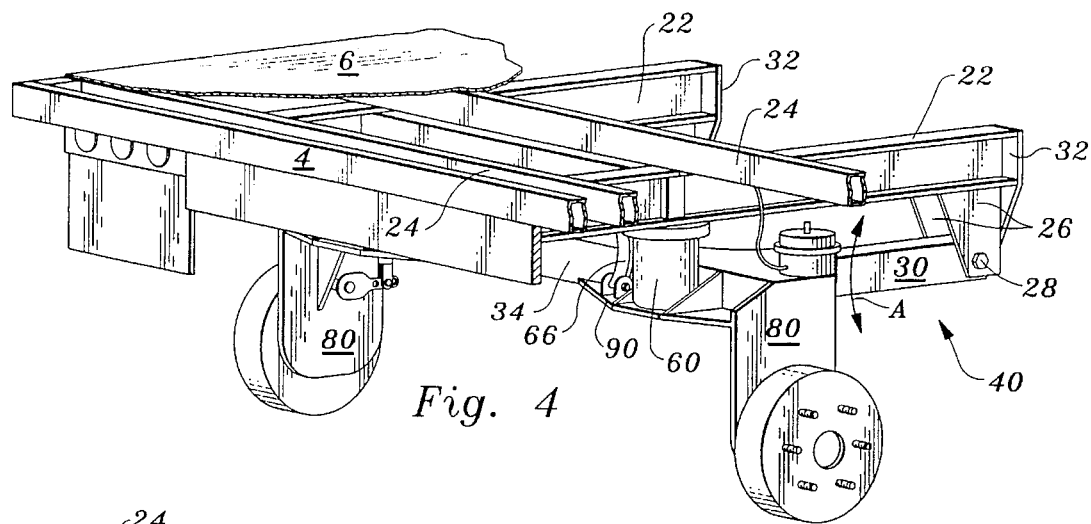
FIG. 4 is a perspective view of the rear of the trailer with portions fragmented away to reveal further details.
Figure 5:
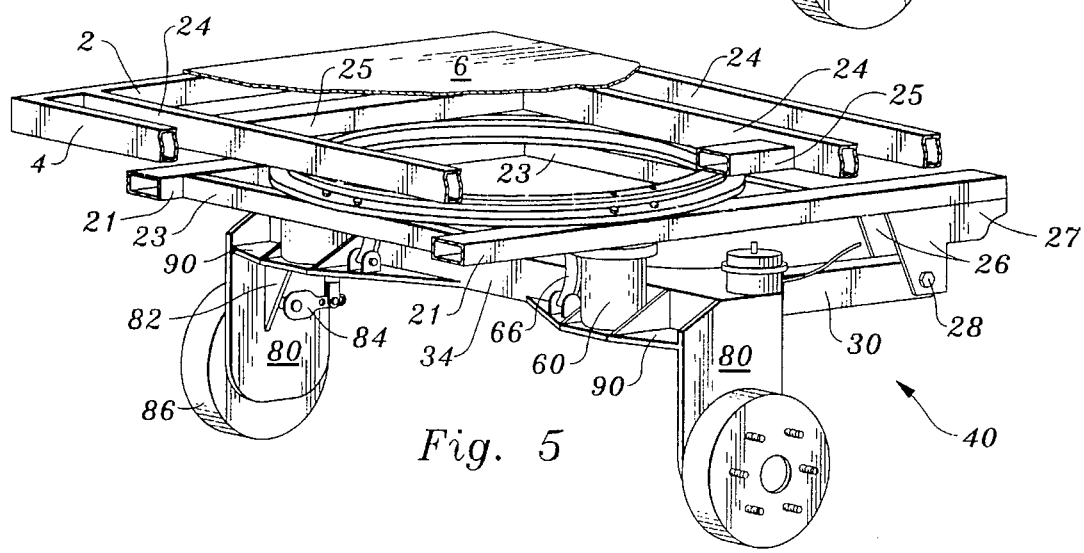
FIG. 5 is a perspective view of a front of one of the trailers with portions fragmented away to provide greater detail.
Figure 6:
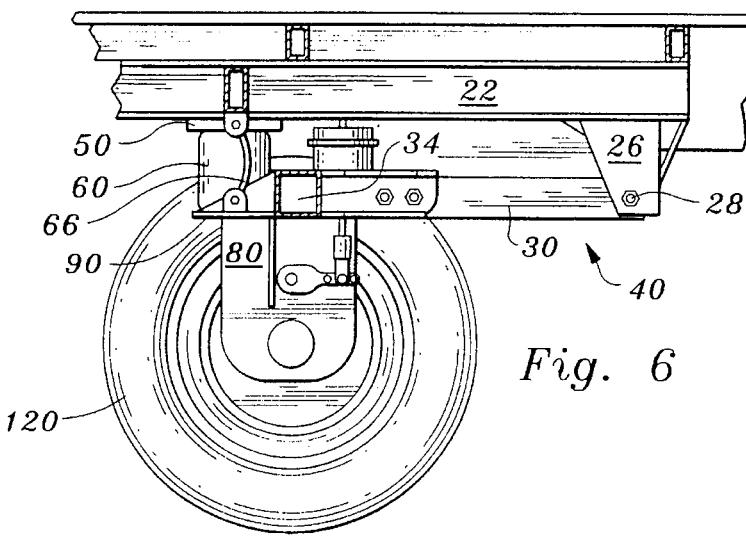
FIG. 6 is a sectional view taken along lines 6—6 of FIG. 3.
Figure 6A:
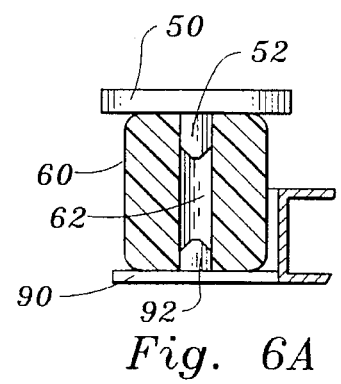
FIG. 6A shows a damping means associated with FIG. 6 in a relatively static, unstressed condition.

More particularly, and with reference to FIGS. 3, 4 and 5, the chassis 20 is formed from a plurality of longitudinally extending rails 2 interconnected by a plurality of latitudinally extending rails 4 providing a rectangular grid affording structural stability to the chassis 20. The rails 2, 4 support a platform 6 on a top aspect thereof, the top platform 6 formed from any suitable decking material relatively impervious to the elements and capable of sustaining loads on a top surface thereof, especially in the form of produce located in boxes. As shown in FIG. 1, for example, the field trailer 10 also includes load bearing walls 8 diagramatically depicted as located on the chassis at forward and rearward portions of the vehicle, although they may also be located along longitudinal side edges of the platform 6.

The longitudinally and latitudinally extending rails 2, 4 also serve as a super structure which fixes and supports a plurality of longitudinally extending braces 22 and latitudinally extending braces 24 inboard and parallel to the respective longitudinal rails 2 and latitudinal rails 4. For example, FIG. 4 shows two I-beams 22 defining longitudinal braces 22 located below the latitudinal rails 4 and extending as a support for the swing arm 40. FIG. 5 details longitudinal braces as box beams 21.

The swing arm 40 includes a swing arm bar 30 sandwiched between a pair of gussets 26 which depend from each longitudinal brace 21, 22, the gussets 26 serving as a pivot area via pivot 28 passing through the gussets 26 to allow the swing arm bar 30 of the swing arm 40 to rotate about the pivot 28 as shown by the direction of the double ended arrow "A" in FIG. 4. The gussets 26 may be further reinforced by means of a second pair of gussets 32 extending transverse to a long axis "L/A" shown in FIG. 3. FIG. 5 configures the gusset 26 reinforcement as rearwardly extending extensions 27 of the gussets.

Figure 7:
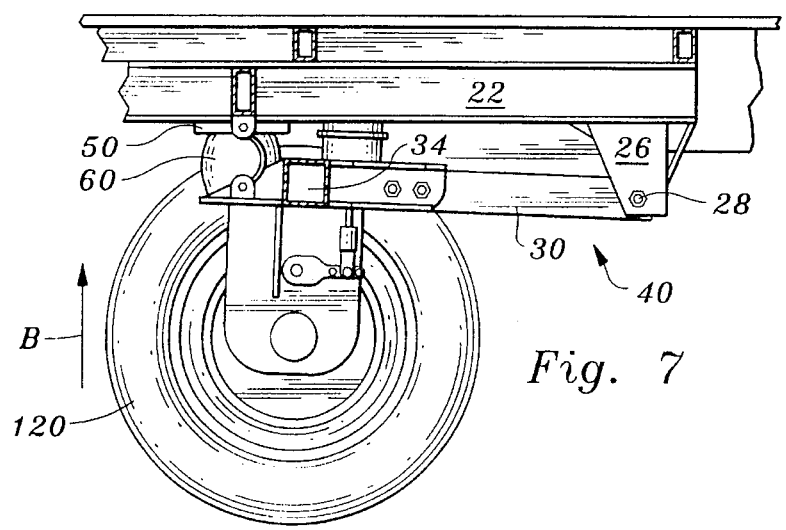
FIG. 7 shows the suspension mechanism of FIG. 6 in a compressed, stressed configuration.
Figure 8:
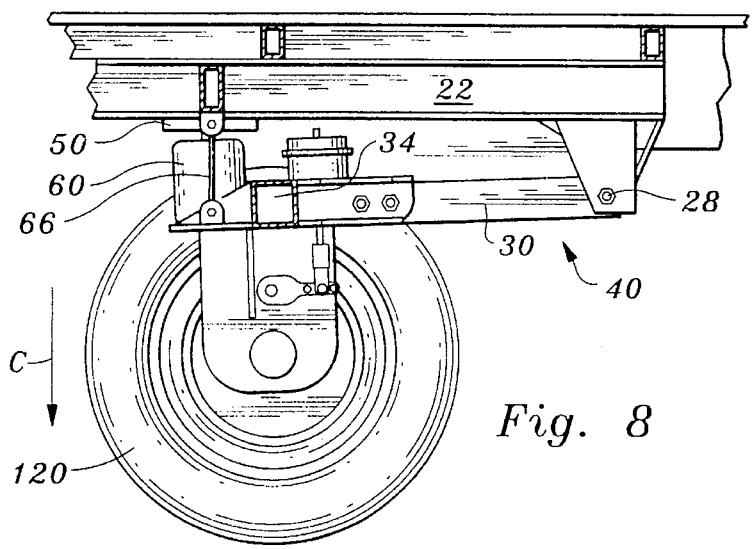
FIG. 8 is a view similar to FIG. 6 showing the suspension mechanism extended.

An end of the swing arm bar 30, remote from the pivot 28, shown in FIGS. 4 through 8, includes a shelf 90 supported at an end of the swing arm bar 30 and a transversely disposed box beam 34 uniting each of two swing arms 40 located at each longitudinal extremity of the vehicle 10. The box beam 34 tends to even out the deflection experienced by the suspension when either (or both) of the two wheels connected to one swing arm 40 contacts a road irregularity, such as a bump. For example, the sequence of drawings in FIGS. 6 through 8, all basically taken along lines 6—6 of FIG. 3, shows the effect on the suspension when the wheel 120 moves the swing arm 40. In FIG. 7, for example, the single ended arrow "B" reflects the compression of the damper 60. FIG. 8, by contrast, shows extension of the damper 60 should the trailer encounter a situation (for example after a bump or when traveling with a relatively light load) where the vehicle is temporarily "unloaded".

Figure 7A:
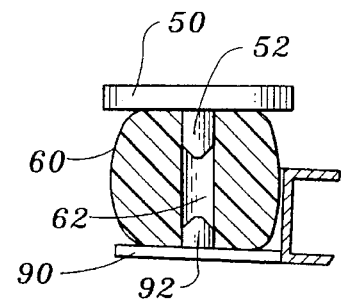
FIG. 7A shows the damper of FIG. 7 as it has been deformed.
Figure 8A:
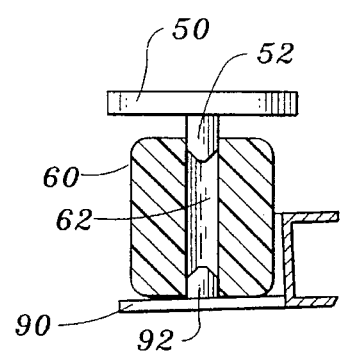
FIG. 8A is a view of the damper similarly extended.
Figure 9:
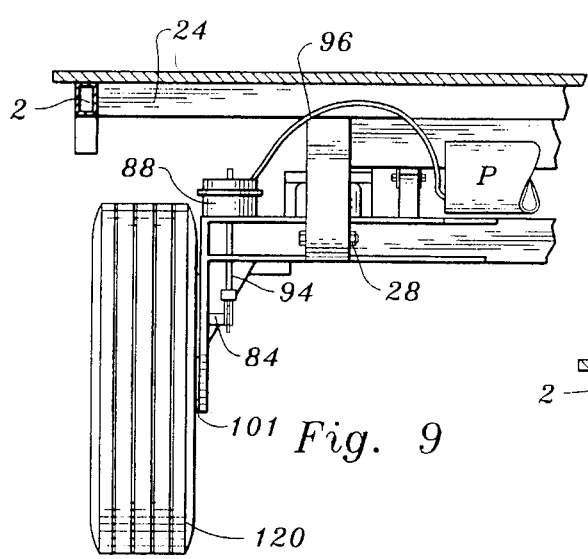
FIG. 9 is a sectional view taken along lines 9—9 of FIG. 3.
Figure 13:
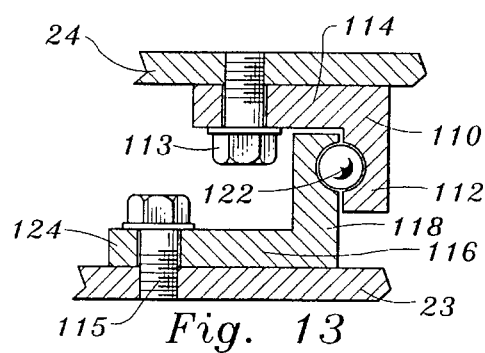
FIG. 13 is a detail of a swivel shown in FIGS. 5, 11 and 12.
Figure 10:
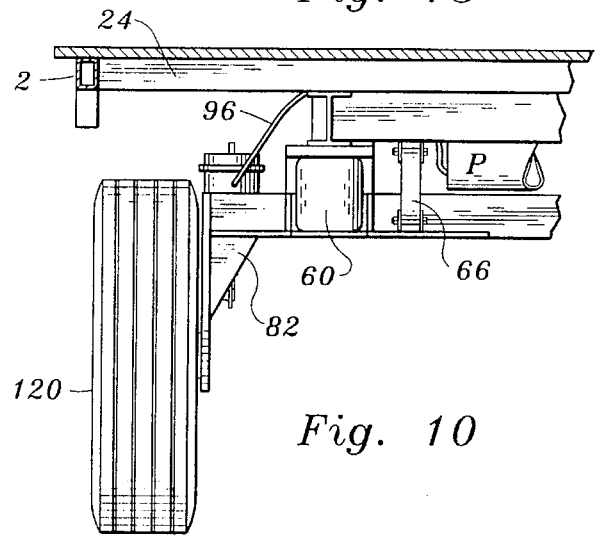
FIG. 10 is a sectional view taken along lines 10—10 of FIG. 3.
Figure 11:
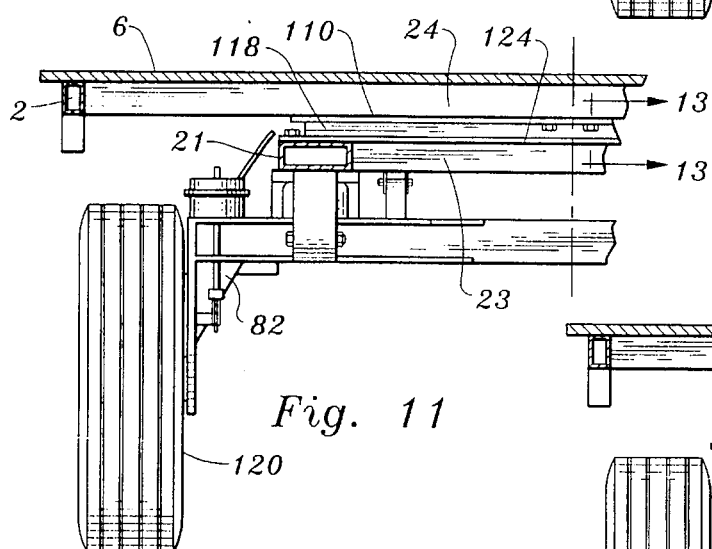
FIG. 11 is a sectional view taken along lines 11—11 of FIG. 3.
Figure 12:
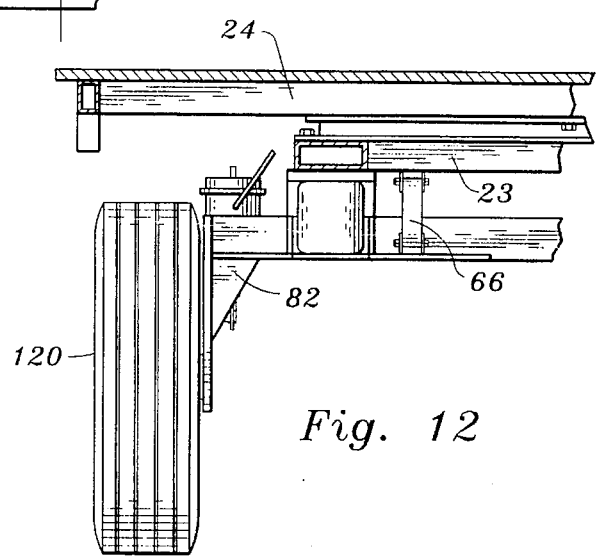
FIG. 12 is a sectional view taken along lines 12—12 of FIG. 3.

A top surface of the shelf 90 supports damper 60. Damper 60 is sandwiched between the shelf 90 and a force distribution plate 50. The shelf includes a locating projection 92. The force distribution plate includes a seating projection 52. Both projections 52, 92 assure that the damper 60 remains properly oriented even when the damper is unloaded as shown in FIG. 8. The damper 60 is a substantially toroid-shaped elastomer having a bore 62 which allows the projections 52, 92 to nest therewithin. The elastomer forming the damper is allowed to compress (FIG. 7A) upon the application of a force along the direction of the arrow "B" (FIG. 7) and expand (FIG. 8A) when unloaded according to the direction of the arrow "C" (FIG. 8). Note that even when the damper is unloaded as shown in FIG. 8, the projections 92 and 52 remain within the bore 62. One of the hallmarks of the swing arm suspension mechanism is that there are no projections or U-shaped shackles or leaf springs having portions which extend down below the bottom surface of the swing arm bar 30 or shelf 90 which would tend to entrain matter as does the prior art.

Note the existence of strap 66 shown in FIGS. 4 through 8. Strap 66 extends between the longitudinal front brace 22 and the shelf 90. In addition, strap 66 extends between the longitudinal rear brace 21 and the shelf 90. Extension of each strap 66 between the longitudinal braces 21, 22 and shelf 90 prevents hyper-extension of the swing arm 40 which could dislodge the locating projections 52 and 92 from the bore 62 of damper 60. Stated alternatively, the strap 66 in FIG. 8 prevents dislocation of the projection pins 52, 92.

Attention is now directed to FIGS. 4, 5, and 9 through 12 which show the means by which the wheel 120 is supported with respect to the chassis 20. As was mentioned, a box beam 34 extends the width of the chassis and is supported by the swing arm bar 30 to move in the direction of the double ended arrow "A". Terminal portions of the box beam 34 are fixed to a downwardly depending vertical wheel plate 80 which is oriented parallel to the long axis "L/A" of the field trailer 10. The downwardly depending vertical wheel plate 80 finds additional support by means of the shelf 90 communicates with a side of wheel plate 80 remote from a wheel 120. Note that the side of the wheel plate remote from the wheel 120 is substantially smooth except for a gusset 82 which may be used to further support the vertical plate 80 in fixed relationship with respect to the shelf 90. The gusset 82 is located on a trailing portion of the vertical plate 80 compared to a "normal" "forward" direction of travel of the field trailer 10, i.e. in the direction of the arrow "D" shown in FIGS. 2 and 3. The vertical wheel plate 80 also supports a brake actuating lever 84. Lever 84 engages brake shoes carried within a drum 86. The brake actuating lever 84 is connected to a source 88 of pneumatic pressure, the source 88 positioned vertically above the actuator arm 84 such that an actuator rod 94 extending therebetween is disposed in a substantially vertical plane. With such an arrangement, the brake actuator rod 94 and lever 84 occupy a relatively small exposed area and a minimum profile to prevent engagement with the produce. An air line 96 is shown (FIG. 9) as communicating with a source of pneumatic pressure P. No wheel support 101 (e.g. FIG. 9) projects onto the inboard side of wheel plate 80.

FIGS. 2 and 3 show two variations of trailer. One variation 100 includes a pair of vertically extending legs 102 adapted to couple with a tractor (not shown) as is common in towed land vehicles. The second vehicle 10 may include a bar hitch 12 that can connect to a trailing portion 14 of the forward trailer 100. The bar hitch 12 communicates with a swivel shown in FIGS. 5, 11, 12 and 13 to allow the second vehicle 10 to trail the first vehicle 100.

As depicted, the swivel includes an upper track 110 of substantially L-shaped configuration having a vertical leg 112 and a horizontal leg 114, with the horizontal leg 114 fastening to super structure below the top platform 6. For example, FIG. 5 suggests that the transverse braces 24 could receive bolts 113 for attachment thereto. Similarly, the swivel also includes a lower brace 116 having a vertical leg 118 upwardly directed and inwardly offset with respect to the other vertical leg 112 and separated therefrom by a gap having a bearing race 122 for relatively low friction engagement. A horizontal leg 124 of the lower brace is attached to braces 23 by means of bolts 115 to allow the bar hitch 12 shown in FIGS. 2 and 3 to move in arcuate fashion as shown in FIG. 3 about the direction of the double ended arrows Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A high-draft land vehicle for use in agricultural environments requiring enhanced clearance between a wheel support of the vehicle and plants upwardly projecting from the earth, comprising in combination:

a pair of wheels oriented to have a substantially common axis of rotation, a support bed having a portion which overlies said pair of wheels, a pair of wheel supports depending downwardly from said bed, each said support configured as a flat wheel plate and each oriented in a vertical plane transverse to said axis of rotation, and said wheel plates having bearing means coupled to said wheels, a brake actuating lever pivotably supported on said flat wheel plate, an actuator rod communicating a brake actuator with said actuating lever, said actuator rod disposed in a substantially vertical plane wherein said brake actuating lever and said actuator rod occupy a relatively small exposed area and a minimum profile to prevent engagement with plants upwardly projecting.

2. The vehicle of claim 1 wherein said bearing means are disposed between said wheel plate and said wheel, thereby providing a smooth contour of said wheel plate on a portion of said wheel plate remote from said wheel and minimizing tendencies of said wheel plate to contact vegetation straddled by said vehicle.

3. The vehicle of claim 2 wherein said wheel supports are connected to said support bed by means of a suspension.

4. The vehicle of claim 3 wherein said suspension includes a plurality of swing arms, each having a first end and a second end, said first end pivotally connected to said bed allowing motion of said swing arm about said pivot.

5. The vehicle of claim 4 wherein each said swing arm's second end is attached to a shelf.

6. The vehicle of claim 5 wherein said shelf supports a damper interposed between said shelf and said bed.

7. A high-draft land vehicle for use in agricultural environments requiring enhanced clearance between a wheel support of the vehicle and plants upwardly projecting from the earth, comprising in combination:

a pair of wheels oriented to have a substantially common axis of rotation, a support bed having a portion which overlies said pair of wheels, a pair of wheel supports depending downwardly from said bed, each said support configured as a flat wheel plate and each oriented in a vertical plane transverse to said axis of rotation, and said wheel plates having bearing means coupled to said wheels, said bearing means are disposed between said wheel plate and said wheel, thereby providing a smooth contour of said wheel plate on a portion of said wheel plate remote from said wheel and minimizing tendencies of said wheel plate to contact vegetation straddled by said vehicle.

said wheel supports are connected to said support bed by means of a suspension, said suspension includes a plurality of swing arms, each having a first end and a second end, said first end pivotally connected to said bed allowing motion of said swing arm about said pivot, each said swing arm's second end is operatively coupled to a shelf, said shelf supports a damper interposed between said shelf and said bed, and wherein said shelf and said bed adjacent said damper includes a strap which limits the degree of motion of said shelf with respect to said bed by straightening said strap.

8. The vehicle of claim 7 including locating projections disposed between said bed and said shelf and oriented to contact said damper.

9. The vehicle of claim 8 wherein said damper includes a central bore aligned with said projections.

10. The vehicle of claim 9 wherein said swing arm is connected to a trailer tongue and a swivel means is interposed between said swing arm and said bed whereby motion of said trailer tongue can occur with respect to said trailer bed by said swivel means.

11. The vehicle of claim 10 wherein said swivel means includes first and second annular rings, said first ring attached to said bed, said second ring attached to said swing arm, and means for rotatably orienting said first and second rings.

12. The vehicle of claim 11 wherein said first ring includes a horizontal leg and a vertical leg and is substantially L-shaped in cross-section, said second ring includes a vertical leg and a horizontal leg, said vertical legs facing each other and spaced therefrom by bearing means.

13. The vehicle of claim 12 including a gusset interposed between a topmost vertical extremity of said wheel plate and a portion of said shelf.

14. The vehicle of claim 13 wherein said wheel plate supports a brake lever, said brake lever in communication with a brake actuator by means of a vertical rod extending therebetween.

15. The vehicle of claim 14 wherein said wheel plate and said swing arm provide a box-shaped void overlying a span between wheels which face each other, whereby a plurality of rows of plants can pass thereunder without being entrained by said trailer.

16. Vehicle running gear for a land vehicle for use both on and off road, comprising in combination:

a chassis, a suspension swing arm having a first end connected to said chassis and a second end, a shelf connected to said second end, a damper disposed between said shelf and said chassis, a strap which limits the degree of motion of said shelf with respect to said chassis by straightening said strap, vertically oriented wheel plates depending from said shelf at lateral extremities of said chassis, and wheels attached to said wheel plates.

17. The vehicle running gear of claim 16 wherein said wheel plate and said swing arm provide a box-shaped void overlying a span between wheels which face each other, whereby a plurality of rows of plants can pass thereunder without being entrained by said land vehicle.

18. The vehicle running gear of claim 17 wherein bearing means are disposed between said wheel plate and said wheel, thereby providing a smooth contour of said wheel plate on a portion of said wheel plate remote from said wheel and minimizing tendencies of said wheel plate to contact vegetation straddled by said vehicle.

19. A combined agricultural and road vehicle for transporting harvested produce from a field, comprising, in combination:

a cargo bed to receive the produce thereon, wheels extending from a lower surface of said bed via vertically depending wheel plates located on opposite sides of said bed, said wheels spaced on said opposite bed sides a distance sufficient to straddle plants bearing the produce which underlie said bed, said wheel plates coupled to said bed via suspension means, said suspension means including a strap means for limiting the degree of motion of said suspension means with respect to said cargo bed by straightening said strap.

20. The vehicle of claim 19 wherein said suspension means includes a plurality of swing arms, each having a first end and a second end, said first end pivotally connected to said bed allowing motion of said swing arm about said pivot.

21. The vehicle of claim 20 wherein each said swing arm's second end is attached to a shelf.

22. The vehicle of claim 21 wherein said shelf supports a damper interposed between said shelf and said bed.

23. A combined agricultural and road vehicle for transporting harvested produce from a field, comprising,, in combination:

a cargo bed to receive the produce thereon, wheels extending from a lower surface of said bed via vertically depending wheel plates located on opposite sides of said bed, said wheels spaced on said opposite bed sides a distance sufficient to straddle plants bearing the produce which underlie said bed, said wheel plates coupled to said bed via suspension means, said suspension means includes a plurality of swing arms, each having a first end and a second end, said first end pivotally connected to said bed allowing motion of said swing arm about said pivot, each said swing arm's second end is operatively coupled to a shelf, said shelf supports a damper interposed between said shelf and said bed, wherein said shelf and said bed adjacent said damper includes a strap which limits the degree of motion of said shelf with respect to said bed by straightening said strap.

24. The vehicle of claim 23 including locating projections disposed between said bed and said shelf and oriented to contact said damper.

25. The vehicle of claim 24 wherein said damper includes a central bore aligned with said projections.

26. The vehicle of claim 6 wherein said shelf and said bed adjacent said damper includes a strap which limits the degree of motion of said shelf with respect to said bed by straightening said strap.

27. The vehicle of claim 26 including locating projections disposed between said bed and said shelf and oriented to contact said damper.

28. The vehicle of claim 27 wherein said damper includes a central bore aligned with said projections.

29. The vehicle of claim 28 wherein said swing arm is connected to a trailer tongue and a swivel means is interposed between said swing arm and said bed whereby motion of said trailer tongue can occur with respect to said trailer bed by said swivel means.

30. The vehicle of claim 29 wherein said swivel means includes first and second annular rings, said first ring attached to said bed, said second ring attached to said swing arm, and means for rotatably orienting said first and second rings.

31. The vehicle of claim 30 wherein said first ring includes a horizontal leg and a vertical leg and is substantially L-shaped in cross-section, said second ring includes a vertical leg and a horizontal leg, said vertical legs facing each other and spaced therefrom by bearings means.

32. The vehicle of claim 31 including a gusset interposed between a topmost vertical extremity of said wheel plate and a portion of said shelf.

33. The vehicle of claim 32 wherein said wheel plate and said swing arm provide a box-shaped void overlying a span between wheels which face each other, whereby a plurality of rows of plants can pass thereunder without being entrained by said trailer.

34. The vehicle of claim 22 including locating projections disposed between said bed and said shelf and oriented to contact said damper.

35. The vehicle of claim 34 wherein said damper includes a central bore aligned with said projections.

36. A high-draft land vehicle for use in agricultural environments, comprising in combination:

a framework having a long axis;

at least two swing arms, each having a first end and a second end, said first end pivotally connected to said framework allowing motion of said swing arm about said pivot, a beam transverse to said long axis uniting said second ends of said swing arms, a shelf operatively coupled to said transverse beam, said shelf supporting a damper interposed between said shelf and an underside of said framework, a strap operatively coupled between said shelf and said framework wherein said strap limits the degree of motion of said shelf with respect to said framework.

37. The vehicle of claim 36 wherein said damper is formed from an elastomer.

38. The vehicle of claim 37 further including vertically oriented wheel plates depending from extremities of said beam and wheels attached to said wheel plates.

39. The vehicle of claim 38 further including a brake lever pivotably supported on at least one said wheel plate, a rod communicating a brake actuator with said brake lever, said rod disposed in a substantially vertical plane.

40. The vehicle of claim 39 wherein said damper is toroid-shaped having a bore therein.

41. A high-draft land vehicle for use in agricultural environments, comprising, in combination:

a framework having a long axis;

a suspension means operatively coupled to said framework;

damping means interposed between said framework and said suspension means;

means to preclude over extension of said suspension means from said framework, said means to preclude over extension separate from said damping means.

42. The vehicle of claim 41 wherein said means to preclude over extension includes a strap operatively coupled between said framework and said suspension means, said strap precluding over extension of said suspension means from said framework.

43. The vehicle of claim 42 wherein said suspension means includes at least two swing arms, each having a first end and a second end, said first end pivotally connected to said framework allowing motion of said swing arm about said pivot.

44. The vehicle of claim 43 further including a beam transverse to said long axis uniting said second ends of said swing arms.

45. The vehicle of claim 44 further including a shelf operatively coupled to said transverse beam and supporting said damping means.

46. The vehicle of claim 45 wherein said damping means is formed from an elastomer.

47. The vehicle of claim 46 further including wheel plates depending from extremities of said beam and supporting wheels.

48. The vehicle of claim 47 further including a brake lever pivotably supported on said wheel plate, a rod communicating a brake actuator with said brake lever, said rod disposed in a substantially vertical plane.

* * * * *